(12) United States Patent
Choi et al.

(10) Patent No.: US 10,689,489 B2
(45) Date of Patent: Jun. 23, 2020

(54) POLYIMIDE-BASED BLOCK COPOLYMER AND POLYIMIDE-BASED FILM COMPRISING THE SAME

(71) Applicant: LG CHEM, LTD., Seoul (KR)

(72) Inventors: Sung Yeol Choi, Daejeon (KR); Byung Guk Kim, Daejeon (KR); Sang Gon Kim, Daejeon (KR); Duk Hun Jang, Daejeon (KR); Hyung Sam Choi, Daejeon (KR)

(73) Assignee: LG CHEM LTD., Seoul (KR)

( * ) Notice: Subject to any disclaimer, the term of this patent is extended or adjusted under 35 U.S.C. 154(b) by 17 days.

(21) Appl. No.: 16/064,405

(22) PCT Filed: Jun. 22, 2017

(86) PCT No.: PCT/KR2017/006601
§ 371 (c)(1),
(2) Date: Jun. 20, 2018

(87) PCT Pub. No.: WO2018/004195
PCT Pub. Date: Jan. 4, 2018

(65) Prior Publication Data
US 2019/0010291 A1    Jan. 10, 2019

(30) Foreign Application Priority Data

Jun. 30, 2016 (KR) .......... 10-2016-0082990
Jun. 20, 2017 (KR) .......... 10-2017-0077971

(51) Int. Cl.
*C08G 73/14* (2006.01)
*C08L 79/08* (2006.01)
(Continued)

(52) U.S. Cl.
CPC .......... *C08G 73/14* (2013.01); *C08G 73/101* (2013.01); *C08G 73/1039* (2013.01);
(Continued)

(58) Field of Classification Search
CPC .............................. C08G 73/00; C08G 73/14
(Continued)

(56) References Cited

U.S. PATENT DOCUMENTS 9,200,117 B2   12/2015   Cho et al.
9,353,224 B2   5/2016    Cho et al.
(Continued)

FOREIGN PATENT DOCUMENTS

CN    105153699 A    12/2015
CN    105461924 A    4/2016
(Continued)

OTHER PUBLICATIONS

U.S. Appl. No. 15/773,829 claims (Year: 2018).*

*Primary Examiner* — Duc Truong
(74) *Attorney, Agent, or Firm* — Dentons US LLP

(57) ABSTRACT

The present disclosure relates to a polyimide-based block copolymer and a polyimide-based film including the same. The polyimide-based block copolymer according to the present disclosure makes it possible to provide a polyimide-based film exhibiting excellent mechanical properties while being colorless and transparent. The polyimide-based film may be used as a cover film of various flexible or foldable devices.

15 Claims, 3 Drawing Sheets

(51) Int. Cl.
- *C08J 5/18* (2006.01)
- *G02B 1/14* (2015.01)
- *C08G 73/10* (2006.01)
- *C09D 179/08* (2006.01)

(52) U.S. Cl.
CPC ..... *C08G 73/1067* (2013.01); *C08G 73/1085* (2013.01); *C08J 5/18* (2013.01); *C08L 79/08* (2013.01); *C09D 179/08* (2013.01); *G02B 1/14* (2015.01); *C08J 2379/08* (2013.01)

(58) Field of Classification Search
USPC .................................................. 528/322, 310
See application file for complete search history.

(56) References Cited

U.S. PATENT DOCUMENTS

| | | |
|---|---|---|
| 9,365,694 B2 | 6/2016 | Cho et al. |
| 9,388,279 B2 | 7/2016 | Cho et al. |
| 2012/0296050 A1 | 11/2012 | Cho et al. |
| 2016/0039977 A1 | 2/2016 | Cho et al. |

FOREIGN PATENT DOCUMENTS

| | | |
|---|---|---|
| EP | 0637613 A1 | 2/1995 |
| JP | 06-240124 A | 8/1994 |
| JP | 2999116 B2 | 1/2000 |
| JP | 2001181390 A | 7/2001 |
| JP | 2006131706 A | 5/2006 |
| JP | 2014210896 A | 11/2014 |
| JP | 5833986 B2 | 12/2015 |
| KR | 1020060019492 A | 3/2006 |
| KR | 100688912 B1 | 2/2007 |
| KR | 1020110010009 A | 1/2011 |
| KR | 1020130029129 A | 3/2013 |
| KR | 1020140016199 A | 2/2014 |
| KR | 1020150024110 A | 3/2015 |
| KR | 1020150025517 A | 3/2015 |
| KR | 101523730 B1 | 5/2015 |
| KR | 1020150113472 A | 10/2015 |
| KR | 1020160059097 A | 5/2016 |
| KR | 1020170136319 A | 12/2017 |

\* cited by examiner

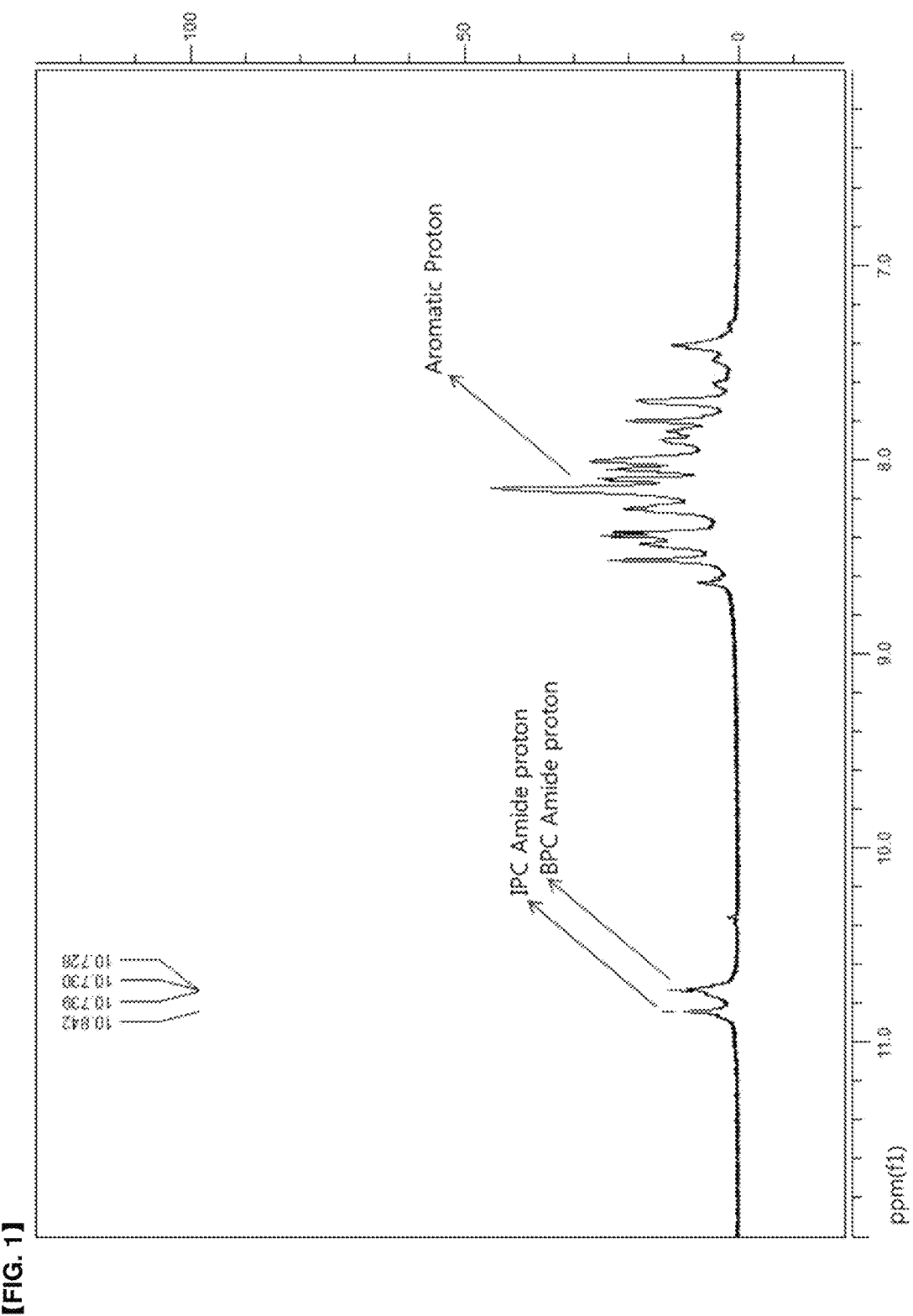
[FIG. 1]

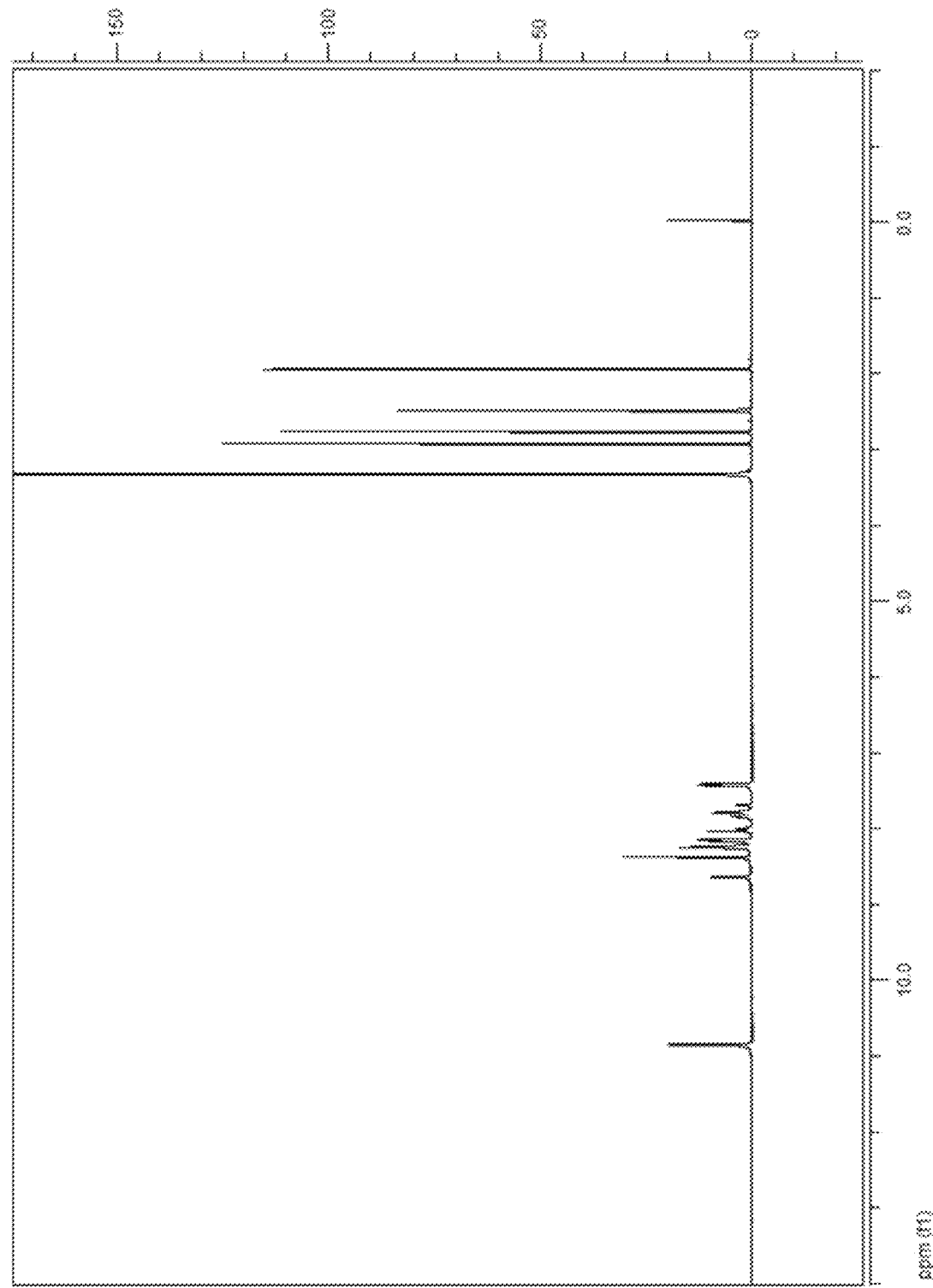
[FIG. 2]

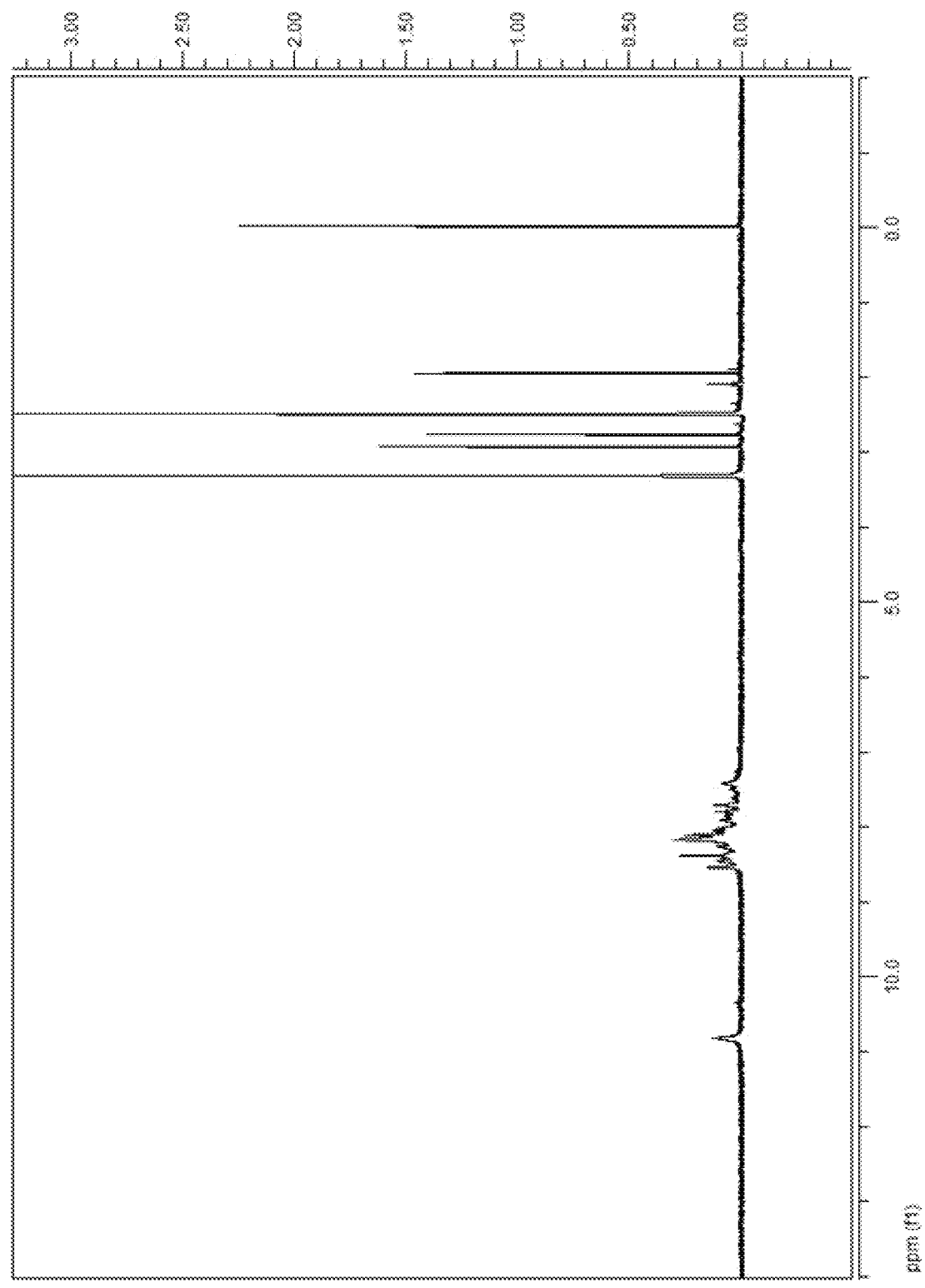
[FIG. 3]

POLYIMIDE-BASED BLOCK COPOLYMER AND POLYIMIDE-BASED FILM COMPRISING THE SAME

CROSS-REFERENCE TO RELATED APPLICATION

This application is a National Stage Application of International Application No. PCT/KR2017/006601, filed Jun. 22, 2017, and claims the benefit of Korean Patent Application No. 10-2017-0077971, filed Jun. 20, 2017, and Korean Patent Application No. 10-2016-0082990, filed Jun. 30, 2016, contents of which are incorporated herein by reference in their entirety for all purposes as if fully set forth below.

TECHNICAL FIELD

The present disclosure relates to a polyimide-based block copolymer and a polyimide-based film including the same.

BACKGROUND OF ART

The aromatic polyimide resin is a polymer mostly having an amorphous structure, and exhibits excellent heat resistance, chemical resistance, electrical properties, and dimensional stability due to its rigid chain structure. The polyimide resin is widely used as an electric/electronic material.

However, the polyimide resin has many limitations in use, because it is dark brown due to the formation of a CTC (charge transfer complex) of π electrons present in the imide chain.

In order to solve the limitations and obtain a colorless transparent polyimide resin, a method of restricting the movement of the π electrons by introducing a strong electron attracting group such as a trifluoromethyl (—CF$_3$) group, a method of reducing the formation of the CTC by introducing a sulfone (—SO$_2$—) group, an ether (—O—) group, or the like into the main chain to make a bent structure, or a method of inhibiting the formation of the resonance structure of the π electrons by introducing an aliphatic cyclic compound, has been proposed.

However, it is difficult for the polyimide resin according to the proposals to exhibit sufficient heat resistance due to the bending structure or the aliphatic cyclic compound, and a film prepared using the same still has limitations such as poor mechanical properties.

DETAILED DESCRIPTION OF THE INVENTION

Technical Problem

The present disclosure is to provide a polyimide-based block copolymer exhibiting excellent mechanical properties while being colorless and transparent.

The present disclosure is also to provide a polyimide-based film including the same.

Technical Solution

The present disclosure provides a polyimide-based block copolymer including
a first repeating unit represented by Chemical Formula 1,
a second repeating unit represented by Chemical Formula 2, and
a third repeating unit represented by Chemical Formula 3.

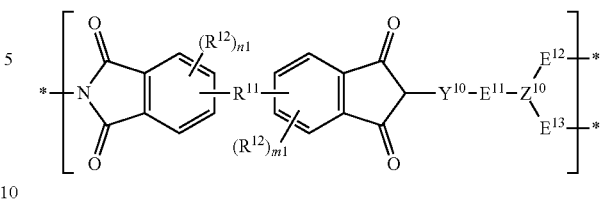

[Chemical Formula 1]

In Chemical Formula 1,
each $R^{11}$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;

each $R^{12}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3;

each $Y^{10}$ is the same as or different from each other in each repeating unit, and each independently includes a C6 to C30 divalent aromatic organic group, and the divalent aromatic organic group exists alone, or two or more aromatic organic groups are bonded to each other to form a divalent condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group;

$E^{11}$, $E^{12}$, and $E^{13}$ are independently a single bond or —NH—; and each $Z^{10}$ is the same as or different from each other in each repeating unit, and each is independently a trivalent linking group derived from at least one compound selected from the group consisting of triacyl halide, tricarboxylic acid, and tricarboxylate.

*―(E$^{21}$-Y$^{20}$-E$^{22}$-Z$^{20}$-E$^{23}$)―*   [Chemical Formula 2]

*―(E$^{31}$-Y$^{30}$-E$^{32}$-Z$^{30}$-E$^{33}$)―*   [Chemical Formula 3]

In Chemical Formulae 2 and 3,
$Y^{20}$ and $Y^{30}$ are the same as or different from each other in each repeating unit, and each independently includes a C6 to C30 divalent aromatic organic group, and the divalent aromatic organic group exists alone, or two or more aromatic organic groups are bonded to each other to form a divalent condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group;

$E^{21}$, $E^{22}$, $E^{23}$, $E^{31}$, $E^{32}$, and $E^{33}$ are independently a single bond or —NH—;

$Z^{20}$ and $Z^{30}$ are the same as or different from each other in each repeating unit, and each is independently a divalent linking group of a —C(=O)-A-C(=O)— form derived from at least one compound selected from the group consisting of diacyl halide, dicarboxylic acid, and dicarboxylate;

in $Z^{20}$ and $Z^{30}$, A is a C6 to C20 divalent aromatic organic group, a C4 to C20 divalent heteroaromatic group, a C6 to C20 divalent alicyclic group, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

two carbonyl groups linked to both sides of A in the $Z^{20}$ are bonded to the meta position with respect to A; and two carbonyl groups linked to both sides of A in the $Z^{30}$ are bonded to the para position with respect to A.

The present disclosure also provides a polyimide-based film including the polyimide-based block copolymer.

Hereinafter, the polyimide-based block copolymer and the polyimide-based film including the same according to the exemplary embodiments of the present disclosure will be described in more detail.

Prior to that, the terms are used merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

Also, the terms including ordinal numbers such as "first" and "second" are used to distinguish one component from another, and the components are not limited by the ordinal number. For example, within the scope of the present invention, the first component may also be referred to as a second component, and similarly, the second component may be referred to as a first component.

I. The Polyimide-Based Block Copolymer

According to an exemplary embodiment of the present disclosure, a polyimide-based block copolymer including a first repeating unit represented by Chemical Formula 1, a second repeating unit represented by Chemical Formula 2, and a third repeating unit represented by Chemical Formula 3 is provided.

[Chemical Formula 1]

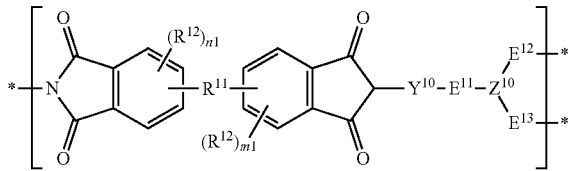

In Chemical Formula 1, each $R^{11}$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;

each $R^{12}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3;

each $Y^{10}$ is the same as or different from each other in each repeating unit, and each independently includes a C6 to C30 divalent aromatic organic group, and the divalent aromatic organic group exists alone, or two or more aromatic organic groups are bonded to each other to form a divalent condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group; and $E^{11}$, $E^{12}$, and $E^{13}$ are independently a single bond or —NH—;

each $Z^{10}$ is the same as or different from each other in each repeating unit, and each is independently a trivalent linking group derived from at least one compound selected from the group consisting of triacyl halide, tricarboxylic acid, and tricarboxylate.

*―(―E$^{21}$-Y$^{20}$-E$^{22}$-Z$^{20}$-E$^{23}$―)―*     [Chemical Formula 2]

*―(―E$^{31}$-Y$^{30}$-E$^{32}$-Z$^{30}$-E$^{33}$―)―*     [Chemical Formula 3]

In Chemical Formulae 2 and 3, $Y^{20}$ and $Y^{30}$ are the same as or different from each other in each repeating unit, and each independently includes a C6 to C30 divalent aromatic organic group, and the divalent aromatic organic group exists alone, or two or more aromatic organic groups are bonded to each other to form a divalent condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group;

$E^{21}$, $E^{22}$, $E^{23}$, $E^{31}$, $E^{32}$, and $E^{33}$ are independently a single bond or —NH—;

$Z^{20}$ and $Z^{30}$ are the same as or different from each other in each repeating unit, and each is independently a divalent linking group of a —C(=O)-A-C(=O)— form derived from at least one compound selected from the group consisting of diacyl halide, dicarboxylic acid, and dicarboxylate;

in $Z^{20}$ and $Z^{30}$, A is a C6 to C20 divalent aromatic organic group, a C4 to C20 divalent heteroaromatic group, a C6 to C20 divalent alicyclic group, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

two carbonyl groups linked to both sides of A in the $Z^{20}$ are bonded to the meta position with respect to A; and two carbonyl groups linked to both sides of A in the $Z^{30}$ are bonded to the para position with respect to A.

As a result of further studies by the present inventors, it was confirmed that the polyimide-based block copolymer including a polyimide chain to which a brancher having three reactive substituents is introduced (a first repeating unit), a second repeating unit to which $Z^{20}$, wherein two —C(=O)— are located at the meta position, is introduced, and a third repeating unit to which $Z^{30}$, wherein two —C(=O)— are located at the para position, is introduced at the same time has excellent processability to be able to easily form a film, and can provide a film which is colorless and transparent, and has excellent mechanical properties.

The brancher may impart a network structure to the copolymer. By the block copolymerization of the repeating units containing the brancher, a network having a rigid and stable structure may be formed in the copolymer. Such a rigid and stable network structure may allow the polyimide-based block copolymer to exhibit improved mechanical properties while being colorless and transparent.

Further, the polyimide-based block copolymer has a structure in which a divalent linking group of a —C(=O)-A-C(=O)— form is introduced to Z20 of the second repeating unit and Z30 of the third repeating unit, respectively.

Particularly, the polyimide-based block copolymer also has a structure in which two carbonyl groups linked to both sides of A in the Z20 are bonded to the meta position with respect to A, and two carbonyl groups linked to both sides of A in the Z30 are bonded to the para position with respect to A.

Accordingly, the polyimide-based block copolymer may exhibit not only excellent processability due to the meta-position bonding of the second repeating unit, but also excellent mechanical properties (particularly, hardness and modulus) due to the para-bonding of the third repeating unit.

That is, the polyimide-based block copolymer includes the first repeating unit to which a trivalent brancher (Z10) is introduced, the second repeating unit to which a group (Z20) wherein two carbonyl groups are bonded to the meta position is introduced, and the third repeating unit to which a group (Z30) wherein two carbonyl groups are bonded to the para position is introduced.

As a consequence, the polyimide-based block copolymer may have excellent processability to be able to easily form a film, and can provide a film which is colorless and transparent, and has improved mechanical properties.

Hereinafter, each repeating unit included in the polyimide-based block copolymer will be described.

(i) The First Repeating Unit

[Chemical Formula 1]

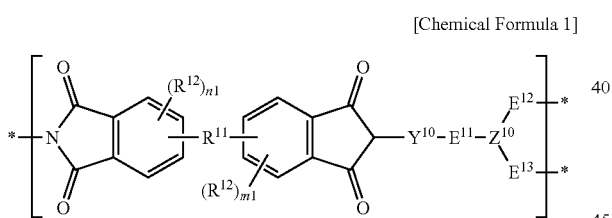

The polyimide-based block copolymer includes the first repeating unit represented by Chemical Formula 1.

The polyimide-based block copolymer may include at least two first repeating units represented by Chemical Formula 1, and these repeating units may have the same or different structures.

In Chemical Formula 1, each $R^{11}$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group.

Here, the single bond means a case that $R^{11}$ in Chemical Formula 1 is a chemical bond which simply links the groups on both sides.

Further, the C6 to C30 divalent aromatic organic group may exist alone; two or more aromatic organic groups may be bonded to each other to form a divalent condensed ring; or two or more aromatic organic groups may be linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group.

Specifically, each $R^{11}$ may be the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—. More specifically, the $R^{11}$ may be a single bond or —C(CF$_3$)$_2$—.

In Chemical Formula 1, the $R^{12}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In Chemical Formula 1, the n1 and m1 are independently an integer of 0 to 3. Preferably, the n1 and m1 may be independently 0 or 1.

In Chemical Formula 1, each $Y^{10}$ is the same as or different from each other in each repeating unit, and each independently includes a C6 to C30 divalent aromatic organic group.

Here, the divalent aromatic organic group may exist alone; two or more aromatic organic groups may be bonded to each other to form a divalent condensed ring; or two or more aromatic organic groups may be linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Specifically, the $Y^{10}$ may be the divalent aromatic organic group represented by the following structure formula.

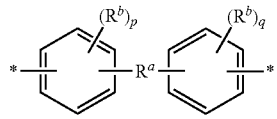

In the structure formula, $R^a$ is a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^b$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and p and q are independently an integer of 1 to 4.

In Chemical Formula 1, $E^{11}$, $E^{12}$, and $E^{13}$ are independently a single bond or —NH—. Here, the single bond means a case that $E^1$, $E^{12}$, and $E^{13}$ are each a chemical bond which simply links the groups on both sides.

In Chemical Formula 1, each $Z^{10}$ is a brancher having three reactive substituents, is the same as or different from each other in each repeating unit, and each is independently a trivalent linking group derived from at least one compound selected from the group consisting of triacyl halide, tricarboxylic acid, and tricarboxylate.

Specifically, $Z^{10}$ may be the trivalent linking group derived from at least one compound selected from the group consisting of a C6 to C20 aromatic triacyl halide, a C6 to C20 aromatic tricarboxylic acid, a C6 to C20 aromatic tricarboxylic acid, a C4 to C20 heteroaromatic triacyl halide containing N, a C4 to C20 heteroaromatic tricarboxylic acid containing N, a C4 to C20 heteroaromatic tricarboxylic acid containing N, a C6 to C20 alicyclic triacyl halide, a C6 to C20 alicyclic tricarboxylic acid, and a C6 to C20 alicyclic tricarboxylic acid.

More specifically, $Z^{10}$ may be selected from the group represented by the following structural formulae.

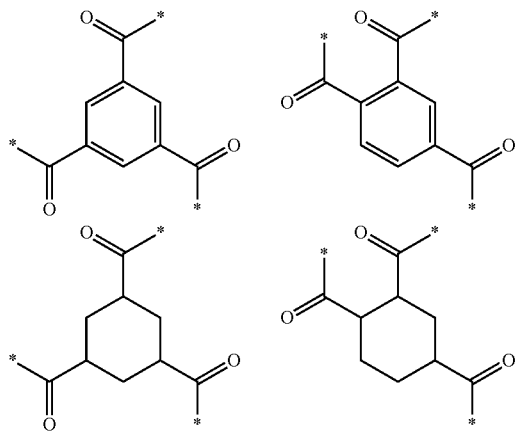

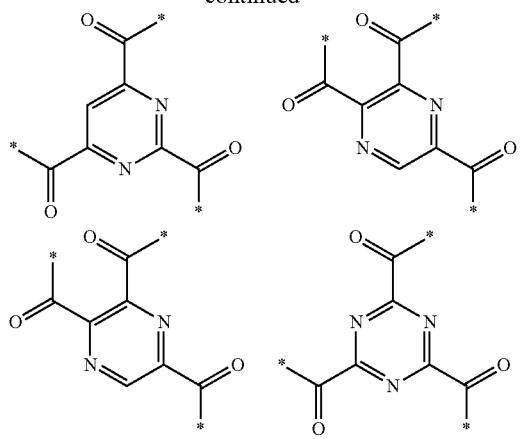

For example, $Z^{10}$ may be a trivalent linking group derived from at least one compound selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

Preferably, the first repeating unit may include repeating units represented by Chemical Formula 1-b and 1-c.

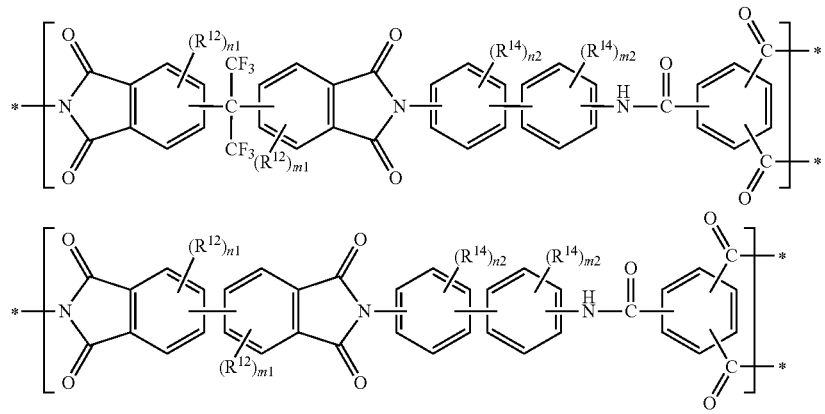

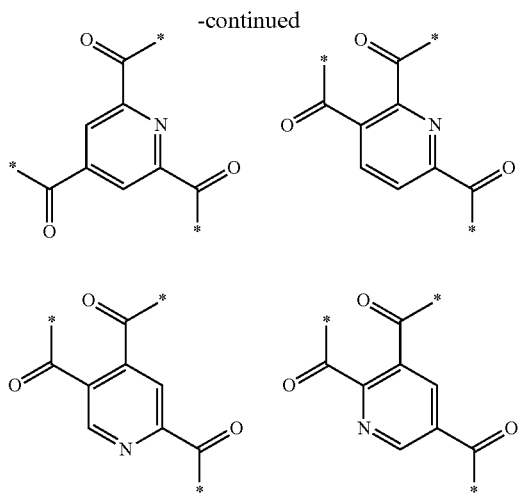

-continued

In Chemical Formulae 1-b and 1-c, $R^{12}$ and $R^{14}$ are independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3; and n2 and m2 are independently an integer of 1 to 4.

(ii) The Second Repeating Unit $$*\!-\!(\!E^{21}\!-\!Y^{20}\!-\!E^{22}\!-\!Z^{20}\!-\!E^{23}\!)\!-\!*$$ [Chemical Formula 2]

The polyimide-based block copolymer includes the second repeating unit represented by Chemical Formula 2.

In Chemical Formula 2, each $Y^{20}$ is the same as or different from each other in each repeating unit, and each independently includes a C6 to C30 divalent aromatic organic group.

Here, the divalent aromatic organic group may exist alone; two or more aromatic organic groups may be bonded to each other to form a divalent condensed ring; or two or more aromatic organic groups may be linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, the Y$^{20}$ may be the divalent aromatic organic group represented by the following structure formula.

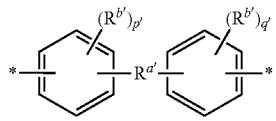

In the structure formula,

R$^{a'}$ is a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each R$^{b'}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and p' and q' are independently an integer of 1 to 4.

In Chemical Formula 2, E$^{21}$, E$^{22}$, and E$^{23}$ are independently a single bond or —NH—. Here, the single bond means a case that E$^{21}$, E$^{22}$, and E$^{23}$ are a chemical bond which simply links the groups on both sides.

In Chemical Formula 2, each Z$^{20}$ is the same as or different from each other in each repeating unit, and each is independently a divalent linking group of a —C(=O)-A-C(=O)— form derived from at least one compound selected from the group consisting of diacyl halide, dicarboxylic acid, and dicarboxylate.

The A is a C6 to C20 divalent aromatic organic group, a C4 to C20 divalent heteroaromatic group, a C6 to C20 divalent alicyclic group or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In particular, the two carbonyl groups linked to both sides of A in the Z$^{20}$ are bonded to the meta position with respect to A.

Specifically, the Z$^{20}$ may be selected from the group represented by the following structural formulae.

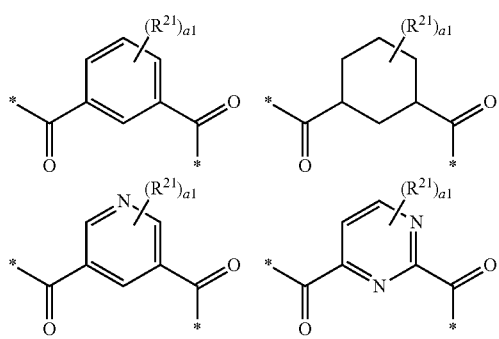

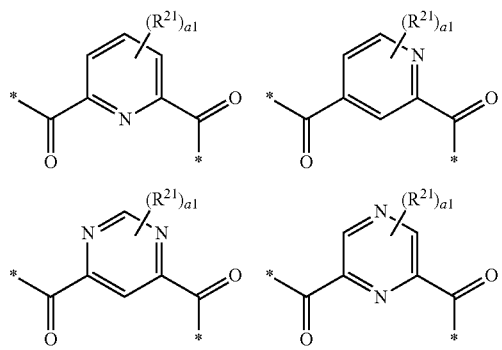

In the structural formulae,

R$^{21}$ is —H, —F, —Cl, —Br, —I, a silyl group containing three C1 to C10 aliphatic organic groups, a C1 to C10 aliphatic organic group, or a C6 to C20 aromatic organic group;

a1 is an integer of 0 to 3; and a2 is an integer of 0 to 2.

More specifically, the Z$^{20}$ may be selected from the group represented by the following structural formulae.

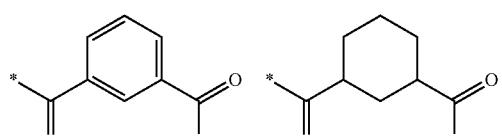

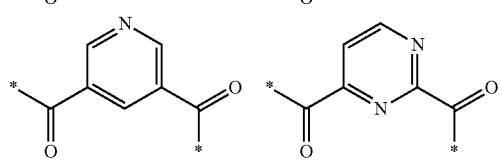

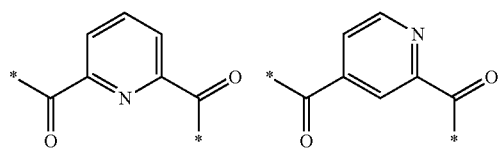

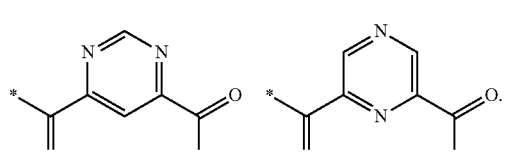

For example, the Z$^{20}$ may be a divalent linking group derived from at least one compound selected from the group consisting of isophthaloyl dichloride (IPC), isophthalic acid, cyclohexane-1,3-dicarbonyl chloride, cyclohexane-1,3-dicarboxylic acid, pyridine-3,5-dicarbonyl chloride, pyridine-3,5-dicarboxylic acid, pyrimidine-2,6-dicarbonyl chloride, and pyrimidine-2,6-dicarboxylic acid.

Preferably, the second repeating unit may include a repeating unit represented by Chemical Formula 2-a.

[Chemical Formula 2-a]

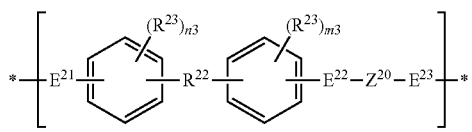

In Chemical Formula 2-a, each $R^{22}$ is the same as or different from each other in each repeating unit, and each is independently a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^{23}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n3 and m3 are independently an integer of 1 to 4;

$E^{21}$, $E^{22}$, and $E^{23}$ are independently a single bond or —NH—; and $Z^{20}$ is selected from the group represented by the following structural formulae.

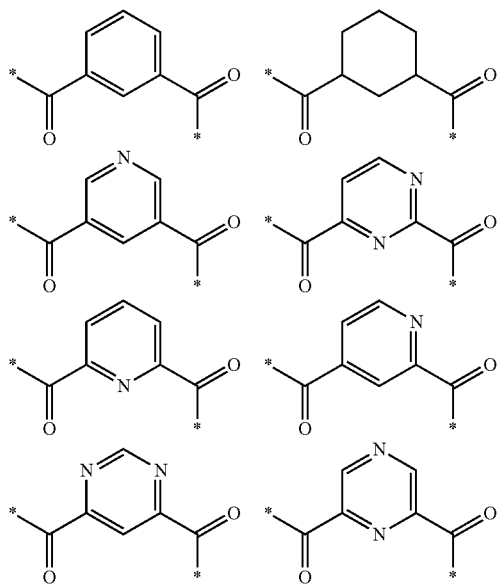

More preferably, the second repeating unit may include a repeating unit represented by Chemical Formula 2-b.

[Chemical Formula 2-b]

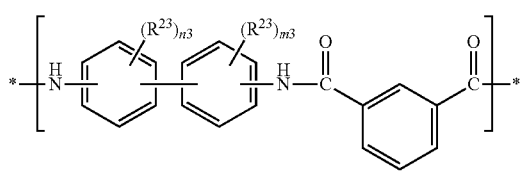

In Chemical Formula 2-b, each $R^{23}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n3 and m3 are independently an integer of 1 to 4.

(iii) The third repeating unit

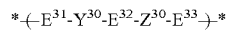  [Chemical Formula 3]

The polyimide-based block copolymer includes the third repeating unit represented by Chemical Formula 3 with the second repeating unit represented by Chemical Formula 2.

In Chemical Formula 3, each $Y^{30}$ is the same as or different from each other in each repeating unit, and each independently includes a C6 to C30 divalent aromatic organic group.

Here, the divalent aromatic organic group may exist alone; two or more aromatic organic groups may be bonded to each other to form a divalent condensed ring; or two or more aromatic organic groups may be linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, the $Y^{30}$ may be the divalent aromatic organic group represented by the following structure formula.

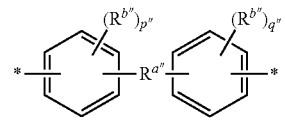

In the structure formula, $R^{a''}$ is a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^{b''}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and p" and q" are independently an integer of 1 to 4.

In Chemical Formula 3, $E^{31}$, $E^{32}$, and $E^{33}$ are independently a single bond or —NH—. Here, the single bond means a case that $E^{31}$, $E^{32}$, and $E^{33}$ are a chemical bond which simply links the groups on both sides.

In Chemical Formula 3, each $Z^{30}$ is the same as or different from each other in each repeating unit, and each is independently a divalent linking group of a —C(=O)-A-C(=O)— form derived from at least one compound selected from the group consisting of diacyl halide, dicarboxylic acid, and dicarboxylate.

The A is a C6 to C20 divalent aromatic organic group, a C4 to C20 divalent heteroaromatic group, a C6 to C20 divalent alicyclic group, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In particular, the two carbonyl groups linked to both sides of A in the $Z^{30}$ are bonded to the para position with respect to A.

Specifically, the $Z^{30}$ may be selected from the group represented by the following structural formulae.

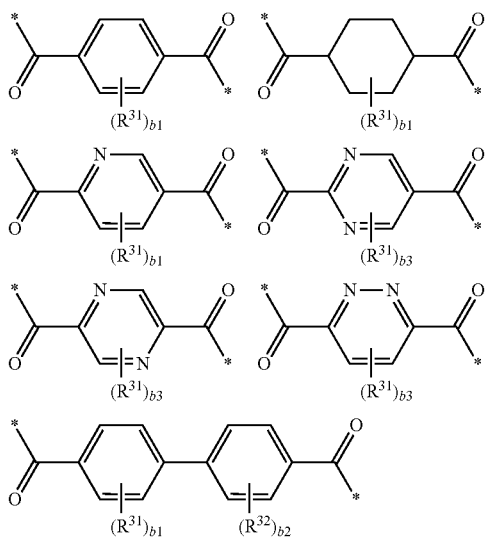

In the structural formulae, $R^{31}$ and $R^{32}$ are independently —H, —F, —Cl, —Br, —I, a silyl group containing three C1 to C10 aliphatic organic groups, a C1 to C10 aliphatic organic group, or a C6 to C20 aromatic organic group;

b1 and b2 are independently an integer of 0 to 3; and b3 is an integer of 0 to 2.

More specifically, the $Z^{30}$ may be selected from the group represented by the following structural formulae.

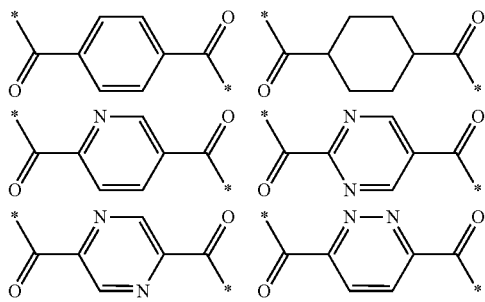

For example, the $Z^{30}$ may be a divalent linking group derived from at least one compound selected from the group consisting of terephthaloyl chloride (TPC), terephthalic acid, cyclohexane-1,4-dicarbonyl chloride, cyclohexane-1,4-dicarboxylic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride (BPC), and 4,4'-biphenyldicarboxylic acid.

Preferably, the third repeating unit may include a repeating unit represented by Chemical Formula 3-a.

[Chemical Formula 3-a]

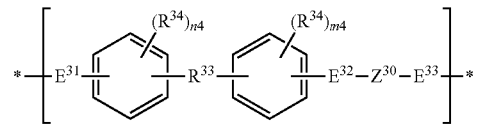

In Chemical Formula 3-a, each $R^{33}$ is the same as or different from each other in each repeating unit, and each is independently a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$, —C(CF$_3$)$_2$—, or —C(=O)NH—;

each $R^{34}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n4 and m4 are independently an integer of 1 to 4;

$E^{31}$, $E^{32}$, and $E^{33}$ are independently a single bond or —NH—; and $Z^{30}$ is selected from the group represented by the following structural formulae.

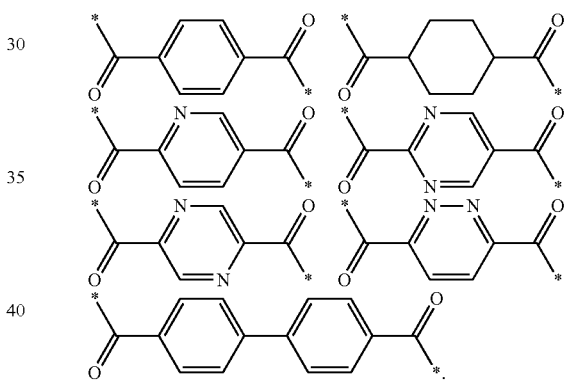

More preferably, the third repeating unit may include a repeating unit represented by Chemical Formula 3-b or 3-c.

[Chemical Formula 3-b]

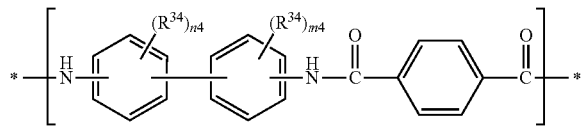

[Chemical Formula 3-c]

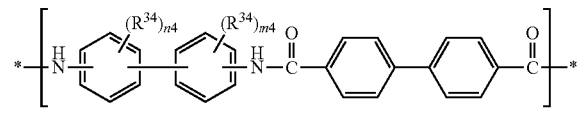

In Chemical Formulae 3-b and 3-c, each $R^{32}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n4 and m4 are independently an integer of 1 to 4.

According to one embodiment of the present disclosure, the presence of the second repeating unit represented by the Chemical Formula 2 and the third repeating unit represented by the Chemical Formula 3 in the polyimide-based block copolymer may be confirmed by NMR spectroscopy.

For example, the polyimide-based block copolymer may exhibit a $^1$H NMR (300 MHz, DMSO-d6, TMS as standard material) spectrum having at least one peak within a δ range of 10.80 ppm to 11.00 ppm, and at least one peak within a δ range of 10.60 ppm to less than 10.80 ppm.

In other words, in a $^1$H NMR spectrum of the polyimide-based block copolymer, the peak according to $Z^{20}$ (including two carbonyl groups bonded to the meta position) of the second repeating unit may be observed within a δ range of 10.80 ppm to 11.00 ppm, and the peak according to $Z^{30}$ (including two carbonyl groups bonded to the para position) of the third repeating unit may be observed within a δ range of 10.60 ppm to less than 10.80 ppm.

(iv) The Molar Ratio of the Repeating Units and the Molecular Weight of the Copolymer, Etc.

In the polyimide-based block copolymer, the molar ratio of the first repeating unit to the second repeating unit may be 1:0.1 to 1:10, and the molar ratio of the second repeating unit to the third repeating unit may be 1:0.5 to 1:2.

For example, the molar ratio of the first repeating unit to the second repeating unit to the third repeating unit may be 1:0.8:0.2 to 1:0.2:0.8.

As described above, the $Z^{10}$ introduced into the first repeating unit is a brancher that imparts a network structure to the copolymer. By the block copolymerization of the repeating units containing the brancher, a network having a rigid and stable structure may be formed in the copolymer. Therefore, when the molar ratio of the first repeating unit is too low, the network structure is not sufficiently formed in the copolymer, thereby the effect of improving the physical properties may be insignificant. However, if the molar ratio of the first repeating unit is too high, gelation may occur during the polymerization.

Particularly, the polyimide-based block copolymer simultaneously including the first repeating unit, the second repeating unit, and the third repeating unit in the above-mentioned molar ratio may expect to have improved transparency of the film mainly due to the first repeating unit containing the brancher ($Z^{10}$), the improved processability of the film mainly due to the second repeating unit containing the $Z^{20}$, and the improved mechanical properties (hardness and modulus) mainly due to the third repeating unit containing the $Z^{30}$.

Further, the polyimide-based block copolymer may have a higher molecular weight than a polyimide resin having a general linear structure, due to a strong and stable network structure. Specifically, the polyimide-based block copolymer may have a weight average molecular weight of 100,000 to 5,000,000 g/mol, preferably 200,000 to 1,000,000 g/mol, more preferably 300,000 to 750,000 g/mol, and still more preferably 500,000 to 650,000 g/mol.

Also, the polyimide-based block copolymer may have a yellow index (YI) of 3.0 or less, 2.90 or less, 2.80 or less, 2.70 or less, 2.60 or less, or 2.55 or less, as measured in accordance with ASTM D1925 and a specimen having a thickness of 30±2 μm.

The polyimide-based block copolymer may be prepared by the method (i.e., sequential polymerization) including the steps of:

mixing a compound forming the first repeating unit in an appropriate solvent to initiate the reaction;

adding a compound forming the second repeating unit and the third repeating unit to the reaction mixture and polymerizing to form a polyamic acid including the first to third repeating units; and forming a polyimide-based block copolymer by imidization of the polyamic acid.

The polymerization conditions for preparing the polyimide-based block copolymer are not particularly limited. Preferably, the polymerization for the formation of the polyamic acid may be carried out by solution polymerization under an inert atmosphere at 0 to 100° C.

Examples of the solvent for forming the polyamic acid may include N,N-dimethylformamide, dimethylacetamide, dimethyl sulfoxide, acetone, N-methyl-2-pyrrolidone, tetrahydrofuran, chloroform, gamma-butyrolactone, and so on.

The imidization after the formation of the polyamic acid may be performed thermally or chemically. For example, compounds such as acetic anhydride and pyridine may be used for the chemical imidization.

II. The Polyimide-Based Film

According to another exemplary embodiment of the present disclosure, a polyimide-based film including the polyimide-based block copolymer is provided.

As described above, it is confirmed that the polyimide-based block copolymer including a polyimide chain to which a brancher having three reactive substituents is introduced (a first repeating unit), a second repeating unit to which $Z^{20}$ wherein two —C(═O)— are located at the meta position is introduced, and a third repeating unit to which $Z^{30}$ wherein two —C(═O)— are located at the para position is introduced at the same time has excellent processability to be able to easily form a film, and can provide a film which is colorless and transparent, and has excellent mechanical properties.

Therefore, the polyimide-based film containing the polyimide-based block copolymer may be used as a material for various molded articles requiring high mechanical properties together with colorless transparency. For example, the polyimide-based film containing the polyimide-based block copolymer may be applied as a substrate for a display, a protective film for a display, a touch panel, a cover film of a flexible or foldable device, or the like.

The polyimide-based film may be prepared by a conventional method such as a dry method or a wet method using the polyimide-based block copolymer. For example, the polyimide-based film may be obtained by coating a solution containing the copolymer on an arbitrary support to form a film, and drying the film by evaporating the solvent from the film. If necessary, stretching and heat treatment for the polyimide-based film may be performed.

The polyimide-based film may exhibit excellent mechanical properties while being colorless and transparent when prepared using the polyimide-based block copolymer.

Specifically, the polyimide-based film may exhibit pencil hardness of at least an HB grade, as measured in accordance with ASTM D3363.

Also, the polyimide-based film may have a yellow index (YI) of 3.0 or less, 2.90 or less, 2.80 or less, 2.70 or less, 2.60 or less, or 2.55 or less, as measured in accordance with ASTM D1925 and a specimen having a thickness of 30±2 μm.

Advantageous Effects

The polyimide-based block copolymer according to the present disclosure makes it possible to provide a polyimide-based film exhibiting excellent mechanical properties while being colorless and transparent.

BRIEF DESCRIPTION OF THE DRAWINGS

FIG. 1 is an NMR spectrum of the polyimide-based copolymer obtained in Example 1.

FIG. 2 is an NMR spectrum of the polyimide-based copolymer obtained in Comparative Example 1.

FIG. 3 is an NMR spectrum of the polyimide-based copolymer obtained in Comparative Example 2.

DETAILED DESCRIPTION OF THE EMBODIMENTS

Hereinafter, preferred examples are provided for better understanding. However, these examples are for illustrative purposes only, and the invention is not intended to be limited by these examples.

Example 1

4.851 g (1.01 eq., 0.01515 mol) of 2,2'-bis(trifluoromethyl)benzidine; 2.665 g (0.4 eq., 0.006 mol) of 4,4'-(hexafluoroisopropylidene)diphthalic anhydride; 2.570 g (0.5825 eq., 0.008738 mol) of 3,3',4,4'-biphenyltetracarboxylic dianhydride; 0.020 g (0.005 eq., 0.000075 mol) of 1,3,5-benzenetricarbonyl trichloride; and 73 ml of N,N-dimethylacetamide were placed to a 500 mL round flask equipped with a Dean-Stark apparatus and a condenser, and the mixture was stirred at 0° C. under a nitrogen atmosphere to carry out the polymerization reaction.

After 4 hours, 4.755 g (0.99 eq., 0.01485 mol) of 2,2'-bis(trifluoromethyl)benzidine; 1.553 g (0.51 eq., 0.00765 mol) of isophthaloyl dichloride; 2.093 g (0.5 eq., 0.0075 mol) of [1,1'-biphenyl]-4,4'-dicarbonyl dichloride; and 66 ml of N,N-dimethylacetamide were added to the product of the polymerization reaction, and the mixture was stirred at room temperature for 4 hours under a nitrogen atmosphere to carry out the polymerization reaction.

14 ml of acetic anhydride and 12 ml of pyridine were added to the polyamic acid solution obtained by the polymerization reaction, and the mixture was stirred in an oil bath at 40° C. for 15 hours to carry out the chemical imidization reaction.

After completion of the reaction, the solid content was precipitated with water and ethanol, and the precipitated solid was filtered and dried at 100° C. for more than 6 hours under vacuum to obtain a polyimide-based block copolymer having the following repeating units (weight average molecular weight: 250,000 g/mol). The $^1$H NMR (300 MHz, DMSO-d6, TMS as standard material) spectrum of the polyimide-based block copolymer is shown in FIG. 1.

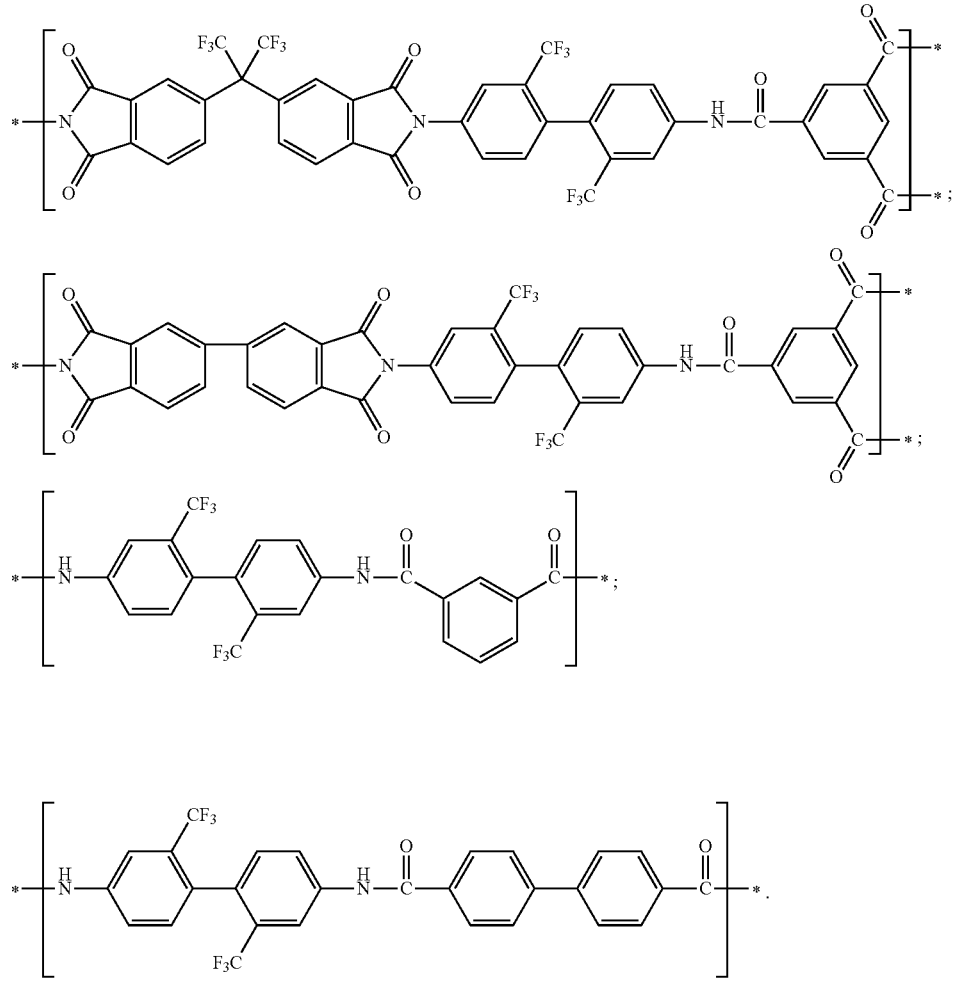

Example 2

A polyimide-based copolymer was obtained in the same manner as in Example 1, except that the content of the monomers in the polymerization reaction was changed to 0.944 g (0.31 eq., 0.00465 mol) of isophthaloyl dichloride and 2.93 g (0.7 eq., 0.0105 mol) of [1,1'-biphenyl]-4,4'-dicarbonyl dichloride (weight average molecular weight: 600,000 g/mol).

Comparative Example 1

3.203 g (1.01 eq., 0.0101 mol) of 2,2'-bis(trifluoromethyl)benzidine; 4.3647 g (0.9825 eq., 0.009825 mol) of 4,4'-(hexafluoroisoproylidene)diphthalic anhydride; 0.0133 g (0.005 eq., 0.00005 mol) of 1,3,5-benzenetricarbonyl trichloride; and 73 ml of N,N-dimethylacetamide were placed to a 250 mL round flask equipped with a Dean-Stark apparatus and a condenser, and the mixture was stirred at 0° C. under a nitrogen atmosphere to carry out the polymerization reaction.

After 4 hours, 9.575 g (2.99 eq., 0.0299 mol) of 2,2'-bis(trifluoromethyl)benzidine; 6.1109 g (3.01 eq., 0.0301 mol) of isophthaloyl dichloride; and 66 ml of N,N-dimethylacetamide were added to the product of the polymerization reaction, and the mixture was stirred at room temperature for 4 hours under a nitrogen atmosphere to carry out the polymerization reaction.

14 ml of acetic anhydride and 12 ml of pyridine were added to the polyamic acid solution obtained by the polymerization reaction, and the mixture was stirred in an oil bath at 40° C. for 15 hours to carry out the chemical imidization reaction.

After completion of the reaction, the solid content was precipitated with water and ethanol, and the precipitated solid was filtered and dried at 100° C. for more than 6 hours under vacuum to obtain a polyimide-based block copolymer having the following repeating units (weight average molecular weight: 700,000 g/mol). The $^1$H NMR (300 MHz, DMSO-d6, TMS as standard material) spectrum of the polyimide-based block copolymer is shown in FIG. 2.

Comparative Example 2

4.851 g (1.01 eq., 0.01515 mol) of 2,2'-bis(trifluoromethyl)benzidine; 2.665 g (0.4 eq., 0.006 mol) of 4,4'-(hexafluoroisopropylidene)diphthalic anhydride; 2.570 g (0.5825 eq., 0.008738 mol) of 3,3',4,4'-biphenyltetracarboxylic dianhydride; 0.0199 g (0.005 eq., 0.000075 mol) of 1,3,5-benzenetricarbonyl trichloride; and 58 ml of N,N-dimethylacetamide were placed to a 250 mL round flask equipped with a Dean-Stark apparatus and a condenser, and the mixture was stirred at 0° C. under a nitrogen atmosphere to carry out the polymerization reaction.

After 4 hours, 4.755 g (0.99 eq., 0.01485 mol) of 2,2'-bis(trifluoromethyl)benzidine; 3.075 g (1.01 eq., 0.0101 mol) of terephthaloyl chloride; and 120 ml of N,N-dimethylacetamide were added to the product of the polymerization reaction, and the mixture was stirred at room temperature for 4 hours under a nitrogen atmosphere to carry out the polymerization reaction.

14 ml of acetic anhydride and 12 ml of pyridine were added to the polyamic acid solution obtained by the polymerization reaction, and the mixture was stirred in an oil bath at 40° C. for 15 hours to carry out the chemical imidization reaction.

After completion of the reaction, the solid content was precipitated with water and ethanol, and the precipitated solid was filtered and dried at 100° C. for more than 6 hours under vacuum to obtain a polyimide-based block copolymer having the following repeating units (weight average molecular weight: 300,000 g/mol). The $^1$H NMR (300 MHz, DMSO-d6, TMS as standard material) spectrum of the polyimide-based block copolymer is shown in FIG. 3.

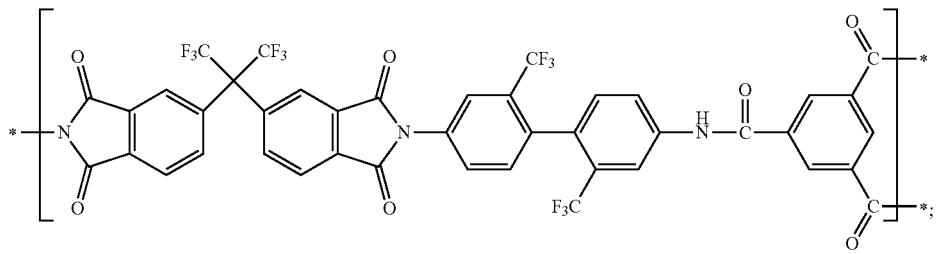

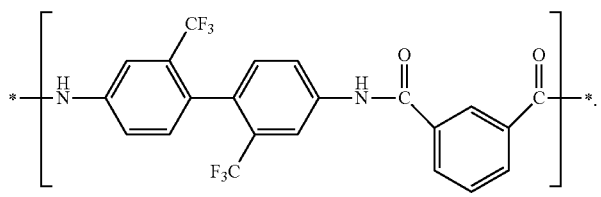

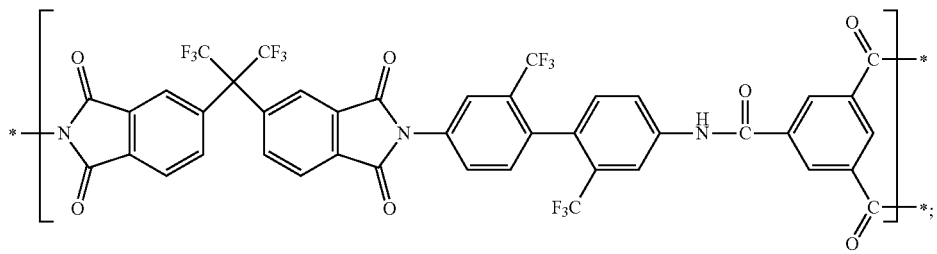

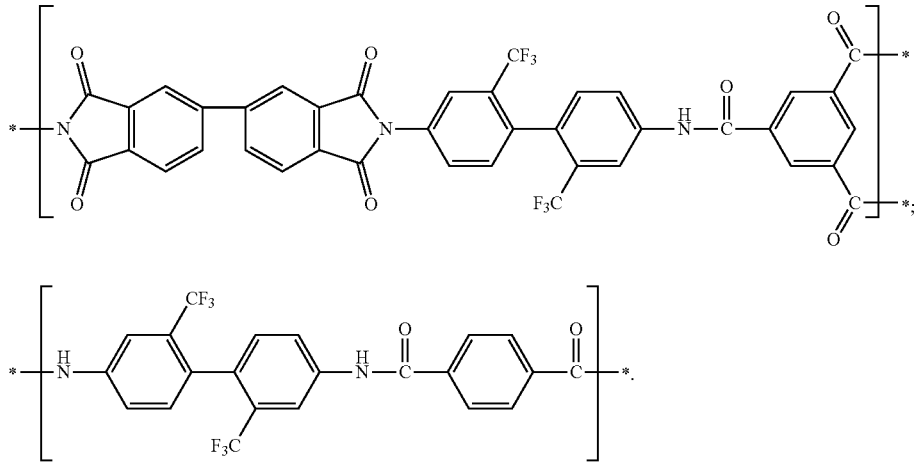

Comparative Example 3

4.80 g (1 eq., 0.015 mol) of 2,2'-bis(trifluoromethyl)benzidine; 6.56 g (0.985 eq., 0.0148 mol) of 4,4'-(hexafluoroisopropylidene)diphthalic anhydride; 1.5227 g (0.5 eq., 0.0075 mol) of isophthaloyl dichloride; 0.039 g (0.01 eq., 0.00015 mol) of benzene-1,3,5-tricarbonyl trichloride; and 70 ml of N,N-dimethylacetamide were placed to a 250 mL round flask equipped with a Dean-Stark apparatus and a condenser, and the reaction was initiated at room temperature.

14 ml of acetic anhydride and 12 ml of pyridine were added to the mixture, and then stirred in an oil bath at 40° C. for 15 hours to carry out the chemical imidization reaction.

After completion of the reaction, the solid content was precipitated with water and ethanol, and the precipitated solid was filtered and dried at 100° C. for more than 6 hours under vacuum to obtain a polyimide-based block copolymer having the following repeating units (weight average molecular weight: 160,000 g/mol).

Example 3

The copolymer obtained in Example 1 was dissolved in N,N-dimethylacetamide to prepare a polymer solution of about 25% (w/V). The polymer solution was poured on a glass plate, casted to a thickness of 335 μm using a film applicator, and dried with hot air at 80° C. for 10 minutes (repeated twice). It was then slowly heated from 100° C. to 250° C. for 2 hours while flowing nitrogen therein, maintained at 250° C. for 30 minutes, and then gradually cooled down to obtain a film having a thickness of 30±2 μm after being peeled off from the glass plate.

Separately, a film having a thickness of 50±2 μm was obtained by the above-described method using the polymer solution.

Example 4

A film having a thickness of 30±2 μm and a film having a thickness of 50±2 μm were obtained respectively in the

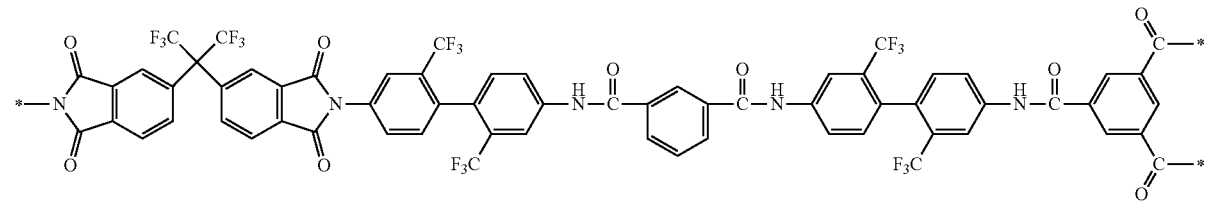 [SMILES: CC(=O)c1cc(C(C)=O)cc(C(=O)Nc2ccc(-c3ccc(NC(=O)c4cccc(C(=O)Nc5ccc(-c6ccc(N7C(=O)c8ccc(C(c9ccc%10c(c9)C(=O)N(C)C%10=O)(C(F)(F)F)C(F)(F)F)cc8C7=O)cc6C(F)(F)F)c(C(F)(F)F)c5)c4)cc3C(F)(F)F)c(C(F)(F)F)c2)c1]

$^1$H NMR (CDCl$_3$, TMS as standard material) δ (ppm): 10.854(s), 8.644(s), 8.256(m), 8.162(d), 8.044(s), 8.017(d), 7.851(d), 7.816(m), 7.7(d), 7.430(d)

same manner as in Example 3, except that the copolymer obtained in Example 2 was used in place of the copolymer obtained in Example 1.

Comparative Example 4

A film having a thickness of 30±2 µm and a film having a thickness of 50±2 µm were respectively obtained in the same manner as in Example 3, except that the copolymer obtained in Comparative Example 1 was used in place of the copolymer obtained in Example 1.

Comparative Example 5

A film having a thickness of 30±2 µm and a film having a thickness of 50±2 µm were respectively obtained in the same manner as in Example 3, except that the copolymer obtained in Comparative Example 2 was used in place of the copolymer obtained in Example 1.

Comparative Example 6

A film having a thickness of 30±2 µm and a film having a thickness of 50±2 µm were respectively obtained in the same manner as in Example 3, except that the copolymer obtained in Comparative Example 3 was used in place of the copolymer obtained in Example 1.

Experimental Examples

The following characteristics were evaluated for the films obtained in the above examples and comparative examples, and the results are shown in Table 1 below.

(1) Pencil Hardness

The pencil hardness of the films having a thickness of 30±2 µm were measured in accordance with ASTM D3363 (750 gf) using a Pencil Hardness Tester.

Specifically, varying hardness values of pencils were fixed to the tester and scratched on the film, and the degree of occurrence of a scratch on the film was observed with the naked eye or with a microscope. When more than 70% of the total number of scratches were not observed, a value corresponding to the hardness of the pencil was evaluated as the pencil hardness of the film.

(2) Mechanical Properties

The elastic modulus (EM, GPa), the ultimate tensile strength (TS, MPa), and the tensile elongation (TE, %) of the films having a thickness of 30±2 µm were measured in accordance with ASTM D 882 using a universal testing machine.

(3) Yellow Index (Y.I.)

The yellow index of the films having a thickness of 30±2 µm was measured in accordance with ASTM D1925 using a UV-2600 UV-Vis Spectrometer (SHIMADZU).

(4) Haziness

The haziness of the films having a thickness of 30±2 µm was measured in accordance with ASTM D1003 using a COH-400 Spectrophotometer (NIPPON DENSHOKU INDUSTRIES).

(5) Folding Endurance

The folding endurance of the films was evaluated using an MIT type folding endurance tester. Specifically, a specimen (1 cm×7 cm) of the film was loaded into the folding endurance tester, and folded to an angle of 135° at a rate of 175 rpm on the left and right sides of the specimen, with a radius of curvature of 0.8 mm and a load of 250 g, until the specimen was fractured. The number of reciprocating bending cycles was measured as the folding endurance.

(6) Processability

The degree of transparency of the film having a thickness of 50±2 µm was observed with the naked eye as compared with the film having a thickness of 30±2 µm. When the transparency indicated by the film having a thickness of 50±2 µm was equal to that of the film having a thickness of 30±2 µm, the film was evaluated as having good processability ("0"), and when the transparency was degraded (for example, was blurry), the film was evaluated as having bad processability ("X").

TABLE 1

| | Film | | | | |
| --- | --- | --- | --- | --- | --- |
| | Example 3 | Example 4 | Comparative Example 4 | Comparative Example 5 | Comparative Example 6 |
| | | | Copolymer | | |
| | Example 1 | Example 2 | Comparative Example 1 | Comparative Example 2 | Comparative Example 3 |
| Pencil hardness | HB | H | 4B | HB | 4B |
| EM (GPa) | 3.31 | 4.99 | 2.53 | 3.42 | — |
| TS (MPa) | 142 | 205 | 95 | 148 | — |
| TE (%) | 13 | 15 | 16.7 | 12 | — |
| Y.I. | 2.51 | 3.23 | 1.98 | 2.96 | 2.5 |
| Haziness | 0.38 | 0.47 | 0.61 | 1.23 | — |
| Folding (cycle) | 310,000 | 310,000 | 250,000 | 20,000 | 58,000 |
| Processability | ○ | ○ | ○ | X | ○ |

Referring to Table 1, it was confirmed that the films of Examples 2 and 3 had low yellow index and haziness, thereby exhibiting excellent mechanical properties and high pencil hardness while being colorless and transparent. The copolymers of Examples 1 and 2 also exhibited transparency equivalent to the film having a thickness of 30±2 µm even when formed into a film having a thickness of 50±2 µm, thus it was confirmed that the processability was good.

The film of Comparative Example 4 showed colorlessness and transparency similar to that of the films according to the examples, but it showed low pencil hardness and poor mechanical properties.

The film of Comparative Example 5 showed pencil hardness and mechanical properties similar to that of the films according to the examples, but it showed poor folding endurance. Further, it was confirmed that the copolymer of Comparative Example 2 had poor processability, because when the copolymer was molded into the film having a thickness of 50±2 µm, it became very hazy compared with the film having a thickness of 30±2 µm.

The film of Comparative Example 6 showed a similar yellow index to that of the films according to the examples, but it showed poor pencil hardness and folding endurance.

The invention claimed is:

1. A polyimide-based block copolymer including
a first repeating unit represented by Chemical Formula 1,
a second repeating unit represented by Chemical Formula 2, and
a third repeating unit represented by Chemical Formula 3:

[Chemical Formula 1]

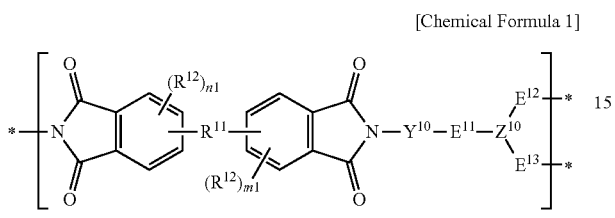

in Chemical Formula 1,
each $R^{11}$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CF$_3$)$_2$—, —C(=O)NH—, or a C6 to C30 divalent aromatic organic group;
each $R^{12}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;
n1 and m1 are independently an integer of 0 to 3;
each $Y^{10}$ is the same as or different from each other in each repeating unit, and each independently comprises a C6 to C30 divalent aromatic organic group, and the divalent aromatic organic group exists alone, or two or more aromatic organic groups are bonded to each other to form a divalent condensed ring, or two or more aromatic organic groups are linked by a single bond, a fluorenyl group, —O—, —S—, —C(=O)—, —CH(OH)—, —S(=O)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group;
$E^{11}$, $E^{12}$, and $E^{13}$ are independently a single bond or —NH—; and
each $Z^{10}$ is the same as or different from each other in each repeating unit, and each is independently a trivalent linking group derived from at least one compound selected from the group consisting of triacyl halide, tricarboxylic acid, and tricarboxylate,

*—(E$^{21}$-Y$^{20}$-E$^{22}$-Z$^{20}$-E$^{23}$)—*      [Chemical Formula 2]

*—(E$^{31}$-Y$^{30}$-E$^{32}$-Z$^{30}$-E$^{33}$)—*      [Chemical Formula 3]

in Chemical Formulae 2 and 3,
$Y^{20}$ and $Y^{30}$ are the same as or different from each other in each repeating unit, and each independently includes a C6 to C30 divalent aromatic organic group, and the divalent aromatic organic group exists alone, or two or more aromatic organic groups are bonded to each other to form a divalent condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH— to form a divalent organic group;
$E^{21}$, $E^{22}$, $E^{23}$, $E^{31}$, $E^{32}$, and $E^{33}$ are independently a single bond or —NH—;
$Z^{20}$ and $Z^{30}$ are the same as or different from each other in each repeating unit, and each is independently a divalent linking group of a —C(=O)-A-C(=O)— form derived from at least one compound selected from the group consisting of diacyl halide, dicarboxylic acid, and dicarboxylate;
in $Z^{20}$ and $Z^{30}$, A is a C6 to C20 divalent aromatic organic group, a C4 to C20 divalent heteroaromatic group, a C6 to C20 divalent alicyclic group, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;
two carbonyl groups linked to both sides of A in the $Z^{20}$ are bonded to the meta position with respect to A; and
two carbonyl groups linked to both sides of A in the $Z^{30}$ are bonded to the para position with respect to A.

2. The polyimide-based block copolymer of claim 1, wherein the first repeating unit comprises a repeating unit represented by Chemical Formula 1-a:

[Chemical Formula 1-a]

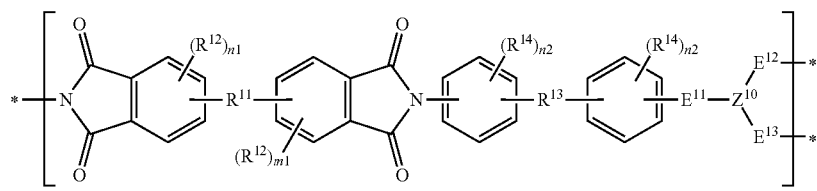

in Chemical Formula 1-a,
each $R^{11}$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;
$R^{12}$ and $R^{14}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;
n1 and m1 are independently an integer of 0 to 3;
n2 and m2 are independently an integer of 1 to 4;

$E^{11}$, $E^{12}$, and $E^{13}$ are independently a single bond or —NH—; and each $Z^{10}$ is the same as or different from each other in each repeating unit, and each is independently a trivalent linking group derived from at least one compound selected from the group consisting of triacyl halide, tricarboxylic acid, and tricarboxylate.

3. The polyimide-based block copolymer of claim 2, wherein $R^{11}$ and $R^{13}$ are the same as or different from each other in each repeating unit, and each is independently a single bond or —C(CF$_3$)$_2$—; and $Z^{10}$ is a trivalent linking group derived from at least one compound selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl benzenetricarboxylate, and trimethyl 1,2,4-benzenetricarboxylate.

4. The polyimide-based block copolymer of claim 1, wherein the first repeating unit comprises repeating units represented by Chemical Formula 1-b and 1-c:

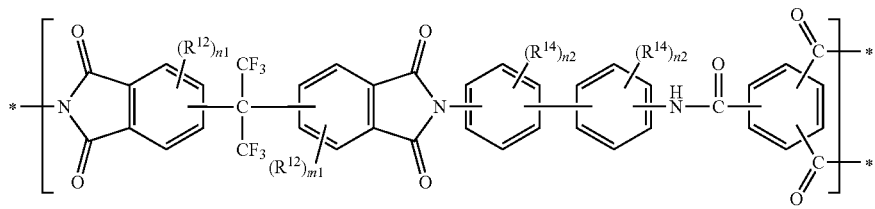

[Chemical Formula 1-b]

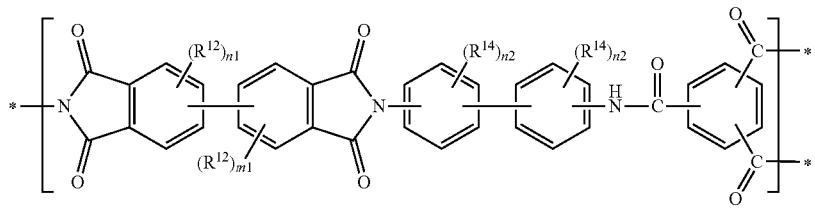

[Chemical Formula 1-c]

in Chemical Formulae 1-b and 1-c, $R^{12}$ and $R^{14}$ are independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3; and n2 and m2 are independently an integer of 1 to 4.

5. The polyimide-based block copolymer of claim 1, wherein $Z^{30}$ is selected from the group represented by the following structural formulae:

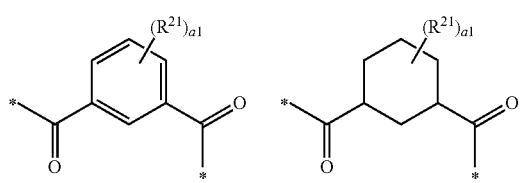

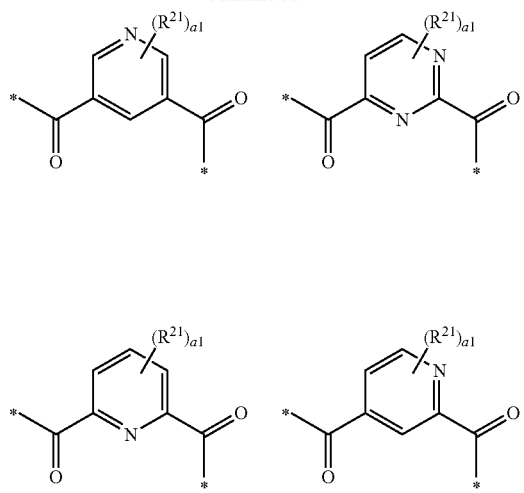

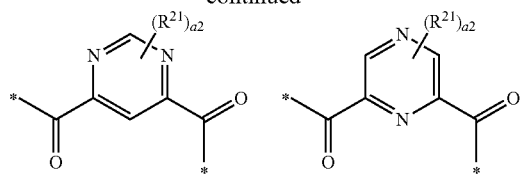

in the structural formulae, $R^{21}$ is —H, —F, —Cl, —Br, —I, a silyl group containing three C1 to C10 aliphatic organic groups, a C1 to C10 aliphatic organic group, or a C6 to C20 aromatic organic group;

a1 is an integer of 0 to 3; and a2 is an integer of 0 to 2.

6. The polyimide-based block copolymer of claim 1, wherein the second repeating unit comprises a repeating unit represented by Chemical Formula 2-a:

[Chemical Formula 2-a]

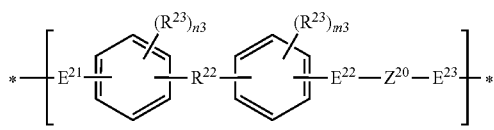

each $R^{22}$ is the same as or different from each other in each repeating unit, and each is independently a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$, —C(CF$_3$)$_2$, or —C(=O)NH—;

each $R^{23}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n3 and m3 are independently an integer of 1 to 4;

$E^{21}$, $E^{22}$, and $E^{23}$ are independently a single bond or —NH—; and $Z^{20}$ is selected from the group represented by the following structural formulae,

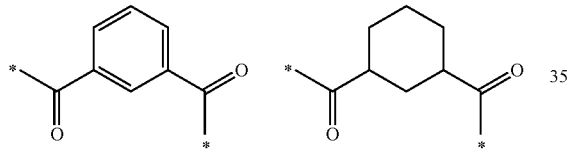

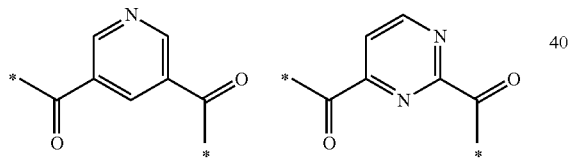

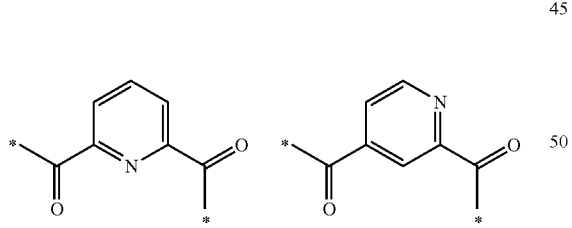

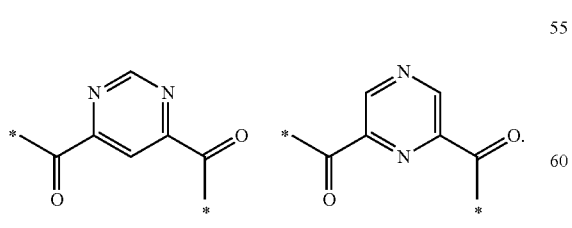

7. The polyimide-based block copolymer of claim 1, wherein the second repeating unit comprises a repeating unit represented by Chemical Formula 2-b:

[Chemical Formula 2-b]

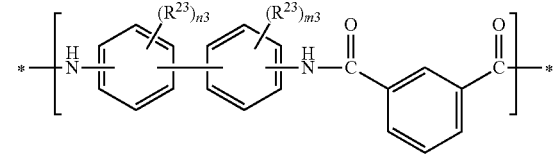

in Chemical Formula 2-b, each $R^{23}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n3 and m3 are independently an integer of 1 to 4.

8. The polyimide-based block copolymer of claim 1, wherein $Z^{30}$ is selected from the group represented by the following structural formulae:

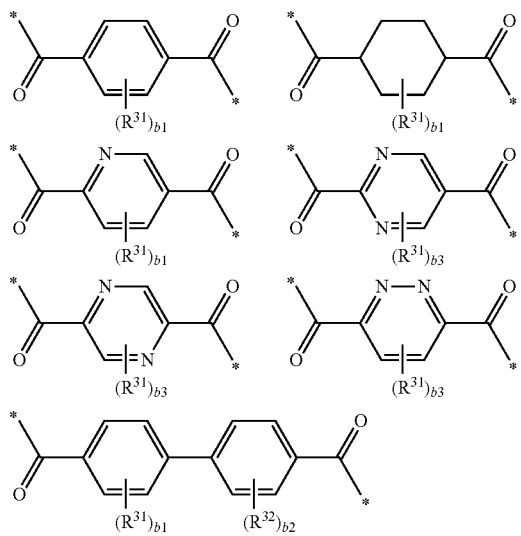

in the structural formulae, $R^{31}$ and $R^{32}$ are independently —H, —F, —Cl, —Br, —I, a silyl group containing three C1 to C10 aliphatic organic groups, a C1 to C10 aliphatic organic group, or a C6 to C20 aromatic organic group;

b1 and b2 are independently an integer of 0 to 3; and b3 is an integer of 0 to 2.

9. The polyimide-based block copolymer of claim 1, wherein the third repeating unit comprises a repeating unit represented by Chemical Formula 3-a:

[Chemical Formula 3-a]

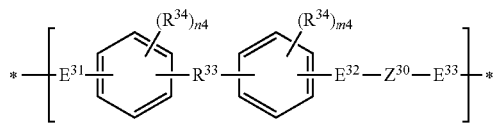

in Chemical Formula 3-a, each $R^{33}$ is the same as or different from each other in each repeating unit, and each is independently a single bond, a fluorenyl group, —O—, —S—, —C(=O)—, —CH(OH)—, —S(=O)₂—, —Si(CH₃)₂—, —(CH₂)$_p$— (wherein 1≤p≤10), —(CF₂)$_q$— (wherein 1≤q≤10), —C(CH₃)₂, —C(CF₃)₂—, or —C(=O)NH—;

each $R^{34}$ is independently —H, —F, —Cl, —Br, —I, —CF₃, —CCl₃, —CBr₃, —CI₃, —NO₂, —CN, —COCH₃, —CO₂C₂H₅, a silyl group containing three C1 to C10 aliphatic organic groups, a C1 to C10 aliphatic organic group, or a C6 to C20 aromatic organic group;

n4 and m4 are independently an integer of 1 to 4;

$E^{31}$, $E^{32}$, and $E^{33}$ are independently a single bond or —NH—; and $Z^{30}$ is selected from the group represented by the following structural formulae,

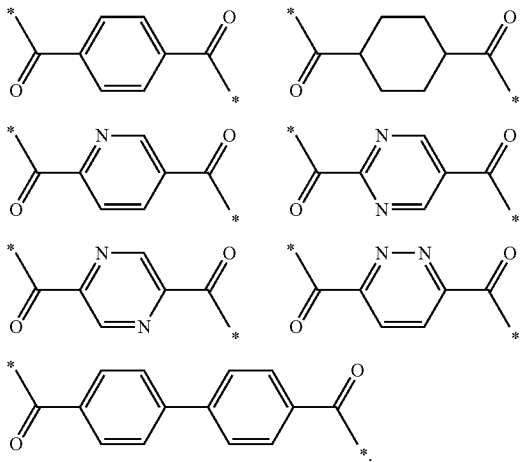

10. The polyimide-based block copolymer of claim 1, wherein the third repeating unit comprises a repeating unit represented by Chemical Formula 3-b or 3-c:

[Chemical Formula 3-b]

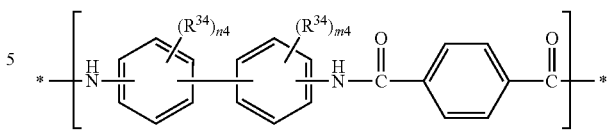

[Chemical Formula 3-c]

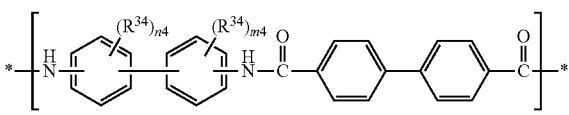

in Chemical Formulae 3-b and 3-c, each $R^{32}$ is independently —H, —F, —Cl, —Br, —I, —CF₃, —CCl₃, —CBr₃, —CI₃, —NO₂, —CN, —COCH₃, —CO₂C₂H₅, a silyl group containing three C1 to C10 aliphatic organic groups, a C1 to C10 aliphatic organic group, or a C6 to C20 aromatic organic group;

n4 and m4 are independently an integer of 1 to 4.

11. The polyimide-based block copolymer of claim 1, wherein the copolymer exhibits a ¹H NMR (300 MHz, DMSO-d6, TMS as standard material) spectrum having at least one peak within a δ range of 10.80 ppm to 11.00 ppm, and at least one peak within a δ range of 10.60 ppm to less than 10.80 ppm.

12. The polyimide-based block copolymer of claim 1, wherein a molar ratio of the first repeating unit:the second repeating unit is 1:0.1 to 1:10, and a molar ratio of the second repeating unit:the third repeating unit is 1:0.5 to 1:2.

13. The polyimide-based block copolymer of claim 1, wherein a weight average molecular weight is 100,000 to 5,000,000 g/mol.

14. A polyimide-based film comprising the polyimide-based block copolymer according to claim 1.

15. The polyimide-based film of claim 14, wherein pencil hardness is at least an HB grade, as measured in accordance with ASTM D3363.

* * * * *